UNITED STATES PATENT OFFICE.

JOHN C. MONTGOMERIE, OF DALMORE, STAIR, SCOTLAND.

PROCESS OF EXTRACTING GOLD OR SILVER FROM ORES.

SPECIFICATION forming part of Letters Patent No. 532,895, dated January 22, 1895.

Application filed March 20, 1894. Serial No. 504,442. (No specimens.) Patented in England July 8, 1892, No. 12,641; in New Zealand October 22, 1892, No. 5,847; in Transvaal December 21, 1892, No. 461; in India April 21, 1893, No. 117; in Cape Colony April 24, 1893, No. 836; in South Australia May 3, 1893, No. 2,474; in New South Wales May 5, 1893, No. 4,392; in Victoria May 10, 1893, No. 10,513; in Tasmania May 13, 1893, No. 1,160; in Canada July 7, 1893, No. 43,524, and in Austria-Hungary August 26, 1893, No. 18,139 and No. 42,062.

*To all whom it may concern:*

Be it known that I, JOHN CUNINGHAME MONTGOMERIE, a subject of the Queen of Great Britain and Ireland, residing at Dalmore, Stair, in the county of Ayr, Scotland, have invented a certain new and useful Improvement in the Extraction of Gold or Silver from Ores or Compounds Containing the Same, (in respect whereof I have obtained Letters Patent in Austria-Hungary, No. 18,139 and No. 42,062, dated August 26, 1893; in India, Reg. No. 117, dated April 21, 1893; in Canada, No. 43,524, dated July 7, 1893; in Cape Colony, Fol. No. 836, dated April 24, 1893; in Great Britain, No. 12,641, dated July 8, 1892; in New South Wales, No. 4,392, dated May 5, 1893; in New Zealand, No. 5,847, dated October 22, 1892; in South Australia, No. 2,474, dated May 3, 1893; in Tasmania, No. 1,160, dated May 13, 1893; in Transvaal, No. 461, dated December 21, 1892, and in Victoria, No. 10, 513, dated May 10, 1893,) of which the following is a specification.

This invention relates to the treatment of auriferous and argentiferous ores or compounds, for the purpose of separating and collecting the gold and silver contained therein, by means of solvent agents—as, for example, cyanide of potassium.

According to a method commonly employed in the recovery of gold and silver by means of cyanide of potassium, the ore or other material, having been reduced to a finely-triturated state, is placed, along with the solvent, in a barrel or other vessel and is there subjected to agitation. After the lapse of a few hours, the contents of the barrel are removed to a filter, where the liquid portion of the charge (containing the precious metals in solution) is separated from the ore. The latter is further washed for the removal of any gold or silver remaining, in solution, therewith. The cyanide solution of gold and silver, as also the wash-water, is then treated for the recovery of the precious metals by precipitation in a zinc filter or percolator.

When a cyanide solvent is employed as hereinbefore described, a certain portion thereof is taken up by base metals and other impurities invariably present in greater or less proportions in the ore. The solvent is also contaminated by the zinc dissolved while the mixture of ore and solvent is under treatment in the zinc percolator; both of these causes resulting in a considerable waste of the cyanide, and in its contamination with deleterious matter.

My improvement in the process of extraction by means of the kind hereinbefore referred to consist in adding sodium oxide or its hydrate (caustic soda), or other suitable oxide of an alkali, or its hydrate, to the cyanide solution before mixing the same with the ore, then charging the vessel with air or oxygen or air and oxygen under pressure, thereupon agitating or otherwise treating the mass for the time requisite for enabling the gold and silver to be dissolved by such a solution, and then discharging the same into a filter and drawing off the original quantity of water employed; the same being highly charged with the unconsumed cyanide and alkali and with the precious metals in solution. In carrying out this stage of the process, a sufficient quantity of water is added to the surface of the ore in the filter so soon as it becomes dry, the added water displacing the liquid remaining in the ore and permittting the latter to be discharged. The liquid obtained is then tested for cyanide of potassium and alkali, and the deficiency supplied by the addition of the necessary quantity of these agents so as to restore the solvent solution to its original character and strength. This solution is now applied to a fresh charge of ore and the same operation is repeated with successive charges till it is found necessary to discharge the solution, with a view to precipitating the gold and silver in the usual manner. Experiment alone can determine the quantity of solvent and of alkali appropriate and the period of time requisite to insure the greatest extraction of the precious metals, and the least consumption of the solvent, as these will vary according to the nature of the ore operated upon. The tailings are then further washed to remove the last trace of gold and silver remaining in solution, and the resultant wash-water is treated in the usual way for the recovery of the precious metals contained therein. By this mode of procedure, considerable economy is effected, both in the quantity of cyanide or other solvent used, and in the cost of working; the quantity of liquid subjected to treatment for the recovery of the gold and silver by precipitation being at the same time greatly reduced.

I am aware that it is not an uncommon practice to neutralize any acid which may be present in the ore by adding carbonate of potash and carbonate of soda thereto prior to the application of the cyanide solution, but such neutralization of the ore with an alkali does not by any means accomplish the object of my invention, or effect the great economy in the cyanide which I am able to obtain by adding a caustic alkali, such as sodium oxide, to the cyanide solution before its admixture with the ore, and conducting the process under pressure of oxygen or air, or a mixture of oxygen and air.

When I specify in my claims the use of an oxide of one of the alkaline bases, I wish it understood that I intend also to include a caustic alkaline base, or an alkaline hydrate, and when I specify the use of oxygen I mean also to include the use of air, or a mixture of oxygen and air.

What I claim as my invention, and desire to secure by Letters Patent, is—

1. The improved process of extracting gold and silver from ores or compounds containing the same, which consists in adding an oxide of one of the alkaline bases to a cyanide solution, then mixing with the ore or compound the solution thus rendered alkaline, then conducting the process under pressure of oxygen, and afterward separating from the ore the liquid containing the gold and silver in solution and treating that liquid in any approved way for the recovery of the precious metals, substantially as described.

2. The improved process of extracting gold and silver from ores or compounds containing the same, which consists in adding an oxide of one of the alkaline bases to a cyanide solution, mixing with the ore or compound the solution thus rendered alkaline, then charging the vessel containing the cyanide solution and ore with oxygen under pressure, then agitating the mass for enabling the gold and silver to be dissolved by such solution, and then filtering the same and drawing off the original quantity of water employed.

3. The improved process of extracting gold and silver from ores or compounds containing the same, which consists in adding to a cyanide solution, sodium oxide before the admixture thereof with the ore or compound, for the purpose of economizing the solvent and obtaining a high percentage of extraction, then mixing the cyanide solution thus rendered alkaline with the ore or compound, and treating it under pressure of oxygen, afterward separating from the ore the liquid containing the gold and silver in solution and treating that liquid in any approved way for the recovery of the precious metals, substantially as described.

JOHN C. MONTGOMERIE.

Witnesses:
F. J. RAPSON,
W. F. CAIN.